United States Patent

Mizumoto et al.

[19]

[11] Patent Number: 6,075,782

[45] Date of Patent: Jun. 13, 2000

[54] FREE CHANNEL DETECTING METHOD AND APPARATUS

[75] Inventors: Toru Mizumoto, Hino; Kenji Fukunabe, Sagamihara, both of Japan

[73] Assignee: Kabushiki Kaisha Toshiba, Kanagawa, Japan

[21] Appl. No.: 08/895,045

[22] Filed: Jul. 16, 1997

[30] Foreign Application Priority Data

Jul. 17, 1996 [JP] Japan ............................ 8-187520

[51] Int. Cl.[7] ........................................... H04J 3/16

[52] U.S. Cl. ........................................ 370/347; 370/442

[58] Field of Search .................................. 370/321, 322, 370/326, 337, 347, 350, 442, 443, 447, 458, 461, 462, 468, 503, 508, 510, 328, 329, 330, 348, 431, 459, 463, 450, 205, 206, 232, 231, 233, 234, 235, 324, 332, 333, 338, 341, 345, 535, 537; 375/222, 235, 239, 240, 261, 298, 371

[56] References Cited

U.S. PATENT DOCUMENTS

| | | | |
|---|---|---|---|
| 4,117,268 | 9/1978 | Bartlett | 370/384 |
| 4,726,020 | 2/1988 | Fino et al. | 370/434 |
| 4,783,780 | 11/1988 | Alexis | 370/280 |
| 5,157,661 | 10/1992 | Kanai et al. | 370/331 |
| 5,260,944 | 11/1993 | Tomabechi | 370/347 |
| 5,471,671 | 11/1995 | Wang et al. | 445/226.2 |
| 5,583,852 | 12/1996 | Ikeda et al. | 370/335 |
| 5,748,621 | 5/1998 | Masuda et al. | 370/337 |

*Primary Examiner*—Dang Ton
*Attorney, Agent, or Firm*—Finnegan, Henderson, Farabow, Garrett & Dunner, L.L.P.

[57] ABSTRACT

A free channel detecting method and device which can detect without fail a free channel regardless of the presence of an interfering wave which partly overlaps with the head and end of a slot configuring a time division channel. Output of an envelope detection circuit for detecting an envelope of a received signal is added to a peak hold circuit, and a free channel is detected according to the output of the peak hold circuit.

12 Claims, 7 Drawing Sheets

FREE CHANNEL DETECTING METHOD AND APPARATUS

BACKGROUND OF THE INVENTION

1. Field of the Invention

The invention relates to a free channel detecting method and device, and more particularly to an improved free channel detecting method and device which can detect a free channel without fail in a communication device which performs time division multiplex communication on a plurality of channels by a modulation method for linear modulation.

2. Description of the Related Art

Conventional communication devices for communicating on a plurality of channels are known as portable radiotelephones and the like.

Such a portable radiotelephone searches a plurality of radio channels for a free radio channel and uses it for communication.

To search for this free radio channel, it is configured that for example, envelope detection of a received signal is performed, a mean value of envelope is determined, and it is determined whether a channel to be used is free or not according to the mean value.

The above-described configuration of determining the mean value does not have any disadvantage for a communication method using a continuous signal, but when a time division channel is used for communication, it has a disadvantage in the response characteristic of a mean circuit for determining the mean value.

Since the mean circuit for determining the mean value is generally formed of a resistor and a capacitor in combination, communication through the time division channel which has a received signal in a burst state takes a long time before the detection value reaches a proper level due to an RC time constant of the mean circuit, and even if there is an interfering wave, it is erroneously detected as a free channel.

In other words, where a free channel is searched for according to a received level signal outputted from the mean circuit, an interfering wave also becomes a burst signal, and detection is performed at three points, namely the head, middle and end of the burst. In this case, the time constant of the mean circuit forms a bottleneck in detecting the head and end of the burst.

For example, as shown in FIG. 7, when the interfering wave is partly overlapped with the last end of a used slot (slot to search for a free channel) SO, a received level signal being outputted from the mean circuit is raised by the interfering wave, but at the last level detection point of the used slot SO, the received level signal being outputted from the mean circuit has not been risen to a proper level, so that regardless of the presence of the interfering wave, the level of the received signal at the pertinent level detection point is determined to be lower than the actual level.

In this free channel detection, determining the received signal level to be lower than the actual level causes a problem that the used slot SO is erroneously detected to be a free channel regardless of the presence of the interfering wave.

To remedy such a problem, a time constant of the mean circuit may be lowered, so that the received level signal being outputted from the mean circuit can be risen quickly. But, when a linear modulation method such as QPSK or π/4 shift QPSK is used, its envelope is also varied with time, and its received level signal also tends to be affected by the varied envelope.

In other words, when the time constant of the mean circuit is lowered, averaging action is decreased, and variation of the output of the mean circuit increases, resulting in a disadvantage of increasing a detection error.

SUMMARY OF THE INVENTION

In view of above, the invention aims to provide a free channel detecting method and device which can detect without fail a free channel regardless of the presence of an interfering wave which partly overlaps with the head and end of a slot configuring a time division channel.

To achieve the above object, a method of detecting a free channel according to the invention comprises:

a first step of receiving a time division multiplex signal which is modulated by linear modulation and multiplied into a plurality of time division channels;

a second step of detecting an envelope of the time division multiplex signal received in the first step;

a third step of operating from time immediately before a desired time division channel among the plurality of time division channels to time immediately after the desired time division channel and detecting a peak value of the envelope detected in the second step; and a fourth step of determining whether the desired time division channel is free or not according to the peak value of the envelope detected in the third step.

The fourth step may be arranged to determine a plurality of sampling values by sampling the peak value of the envelope detected in the third step at a plurality of timing within the desired time division channel, and to determine whether the desired time division channel is free or not according to the plurality of sampling values.

The fourth step may be arranged to deduct a desired reference value from the peak value of the envelope detected in the third step and to determine whether the desired time division channel is free or not according to the deducted value.

The fourth step may be arranged to include a fifth step of determining a mean value of the envelope detected in the second step, and a sixth step of selecting either the peak value of the envelope detected in the third step or the mean value detected in the fifth step, and may be arranged to determine whether the desired time division channel is free or not based on the peak value selected in the sixth step and to determine the reception level based on the mean value.

A device for detecting a free channel according to the invention comprises:

receiving means for receiving a time division multiplex signal which is modulated by linear modulation and multiplied into a plurality of time division channels;

envelope detecting means for detecting an envelope of the time division multiplex signal received by the receiving means;

peak value detecting means for detecting a peak value of the envelope detected by the envelope detecting means by operating from time immediately before a desired time division channel among the plurality of time division channels to time immediately after the desired time division channel; and judging means for determining whether the desired time division channel is free or not according to the peak value of the envelope detected by the peak value detecting means.

The judging means may include:

sampling means for sampling the peak value of the envelope detected by the peak value detecting means with a plurality of timing in the desired time division channel; and means for judging whether the desired time division channel is free or not according to a plurality of sampling values sampled by the sampling means.

The judging means may include:

deducting means for deducting a desired reference value from the peak value of the envelope detected by the peak value detecting means; and means for judging whether the desired time division channel is free or not according to a deduction output of the deducting means.

The judging means may include:

mean value detecting means for determining a mean value of the envelope detected by the envelope detecting means;

selecting means for selecting either the peak value of the envelope detected by the peak value detecting means or the mean value detected by the mean value detecting means;

means for determining whether the desired time division channel is free or not according to the peak value selected by the selecting means; and means for determining a reception level according to the mean value selected by the selecting means.

A communication device according to the invention comprises:

receiving means for receiving a time division multiplex signal which is modulated by linear modulation and multiplied into a plurality of time division channels;

envelope detecting means for detecting an envelope of the time division multiplex signal received by the receiving means;

peak value detecting means for detecting a peak value of the envelope detected by the envelope detecting means by operating from a timing immediately before a desired time division channel among the plurality of time division channels to a timing immediately after the desired time division channel;

judging means for determining whether the desired time division channel is free or not according to the peak value of the envelope detected by the peak value detecting means; and setting means for setting as a reception channel a time division channel determined as the free channel by the judging means.

The judging means may include:

sampling means for sampling the peak value of the envelope detected by the peak value detecting means with a plurality of timing in the desired time division channel; and means for judging whether the desired time division channel is free or not according to a plurality of sampling values sampled by the sampling means.

The judging means may include:

deducting means for deducting a desired reference value from the peak value of the envelope detected by the peak value detecting means; and means for judging whether the desired time division channel is free or not according to a deduction output of the deducting means.

The judging means may include:

mean value detecting means for determining a mean value of the envelope detected by the envelope detecting means;

selecting means for selecting either the peak value of the envelope detected by the peak value detecting means or the mean value detected by the mean value detecting means;

means for determining whether the desired time division channel is free or not according to the peak value selected by the selecting means; and means for determining a reception level according to the mean value selected by the selecting means.

By configuring as described above, a free channel can be detected without fail even if there is an interfering wave which partly overlaps with the head and end of respective slots configuring the time division channel.

DESCRIPTION OF THE PREFERRED EMBODIMENTS

Embodiments of a free channel detecting method and apparatus according to the invention will be described in detail with reference to the accompanying drawings.

Figure 1:
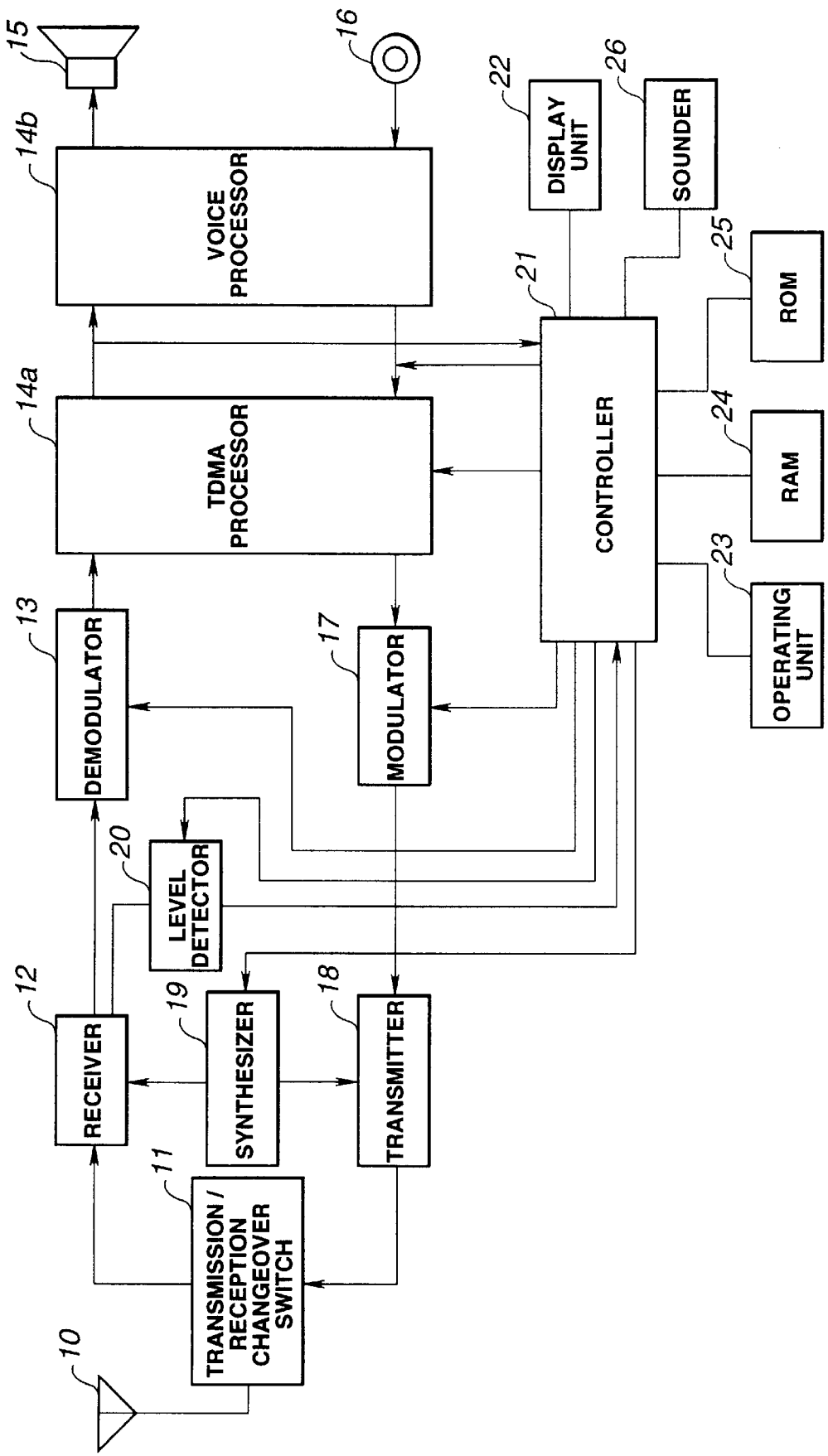
FIG. 1 is a block diagram schematically showing one embodiment of a communication device configured according to the free channel detecting method and apparatus of the invention.

FIG. 1 is a block diagram schematically showing one embodiment of a communication device configured according to the free channel detecting method and apparatus of the invention;

A communication device 100 shown in FIG. 1 performs time division multiplex communications with a base station (not shown) through a plurality of channels by using a linear modulation as a modulation method, and selects a free channel from a plurality of time division channels and establishes a wireless line for communications.

The communication device 100 comprises an antenna 10 for transmission/reception of radio signals with the base station; a transmission/reception changeover switch (TR changeover switch) 11 which outputs the radio signals received by the antenna 10 to a receiver 12 and sends an output of a transmitter 18 to the antenna 10; the receiver 12 for performing reception operations of mixing a frequency signal corresponding to a reception channel and outputted from a synthesizer 19 and a radio signal inputted from the TR changeover switch 11 and converting it into a base signal; a demodulator 13 which comprises a linear demodulator such as a $\pi/4$ shift QPSK demodulator to demodulate the output of the receiver 12; a TDMA processor 14a for performing a TDMA (Time Division Multiple Access) processing to take a self-slot signal from the received signal demodulated by the demodulator 13 and to put a transmission signal inputted from a voice processor 14b or a controller 21 onto a self slot; the voice processor 14b which converts the received signal outputted from the TDMA processor 14a into a voice signal to output to a loud speaker 15 and also converts the voice signal inputted from a microphone 16 into a transmission signal to output to the TDMA processor 14a; the loud speaker 15 which configures a telephone receiver; the microphone 16 which configures a telephone microphone; a modulator 17 which comprises a linear modulator such as a π/4 shift QPSK modulator to modulate the transmission signal outputted from the TDMA processor 14a; a transmitter 18 which mixes the output from the modulator 17 with a frequency signal corresponding to the transmission channel and outputted from the synthesizer 19 and converts into a radio signal; the synthesizer 19 which produces the frequency signal corresponding to a transmission/reception channel; the controller 21 comprising a CPU or the like which controls the demodulator 13, the TDMA processor 14a, the modulator 17, the synthesizer 19 and the like; a display unit 22 which is connected to the controller 21 and comprises an LCD or the like to display various kinds of information; an operating unit 23 which is connected to the controller 21 and used for dialing and the like; a random-access memory (RAM) 24 which is connected to the controller 21 and functions as work area for the controller 21; a read-only memory (ROM) 25 which is connected to the controller 21 and stores a control program and the like for the controller 21; and a sounder 26 which is connected to the controller 21 and produces a ringing tone.

When a power switch (not shown) of the communication device 100 is turned on, the controller 21 controls the synthesizer 19 to scan the control channels with the base station, e.g., to perform P-CH scanning to selectively catch a control channel having the maximum electric field intensity. And, control information is received from the base station through the control channel caught by the P-CH scanning, and the communication device 100 is controlled to be in a stand-by state.

When a calling signal is received from the base station while the communication device 100 is controlled in the stand-by state, the calling signal is inputted into the controller 21 through the antenna 10, the TR changeover switch 11, the receiver 12, the demodulator 13, and the TDMA processor 14a.

Upon detecting the reception of the calling signal from the base station, the controller 21 produces an answer signal and sends it to the base station through the TDMA processor 14a, the modulator 17, the transmitter 18, the TR changeover switch 11, and the antenna 10.

The base station which has received the answer signal from the communication device 100 sends a talking channel designation signal for designating a talking channel to be used for talking to the communication device 100.

The communication device 100 which has received the talking channel designation signal from the base station inputs the talking channel designation signal into the controller 21 through the antenna 10, the TR changeover switch 11, the receiver 12, the demodulator 13, and the TDMA processor 14a. And, the controller 21 controls the synthesizer 18 according to the talking channel designation signal to establish a talking channel between the mobile device 100 and the base station 200.

Then, the communication device 100 receives a ringing signal being sent from the base station and enters it into the controller 21 through the antenna 10, the TR changeover switch 11, the receiver 12, the demodulator 13, and the TDMA processor 14a. In response to the detection of the ringing signal, the controller 21 generates a ringing tone from the sounder 26.

When the operating unit 23 is operated for off-hook in response to the ringing tone, an off-hook signal is sent to the base station through the controller 21, the TDMA processor 14a, the modulator 17, the transmitter 18, the TR changeover switch 11, and the antenna 10. Thus, talking with the calling party can be made through the communication device 100.

In this talking state, the radio signal received from the base station is added to the loud speaker 15 through the antenna 10, the TR changeover switch 11, the receiver 12, the demodulator 13, the TDMA processor 14a and the voice processor 14b, and outputted as voice from the loud speaker 15.

And the voice signal inputted from the microphone 16 is sent as a radio signal to the base station through the voice processor 14b, the TDMA processor 14a, the modulator 17, the transmitter 18, the TR changeover switch 11, and the antenna 10.

The above description was made on a case of receiving a calling signal from the base station. Meanwhile, to call from the communication device 100, the operating unit 23 is first operated for off-hook and a talking channel is established by the control of the control unit 21 between the communication device 100 and the base station. Then, the number of a destination party is dialed on the operating unit 23 to get connected to the called party through the base station. Thus, a talking state with the called party is established.

After establishing the talking state, the communication device 100 operates in the same way as when it has received a calling signal from the base station.

And, when the called party to whom connection was made through the base station operates for on-hook or the operating unit 23 of the communication device 100 is operated for on-hook while still being connected, the talking channel between the base station and the communication device 100 is disconnected restoring to the stand-by state.

When the communication device 100 is used to establish a radio line with the base station, it performs free channel detection to find a free slot which forms the time division channel, namely to examine whether a slot to be used has been used by another communication device or whether it is not available because of an interfering wave.

This free channel detection is performed by detecting a reception level of the received signal, which is taken out of the receiver 12, by a level detector 20.

Figure 2:
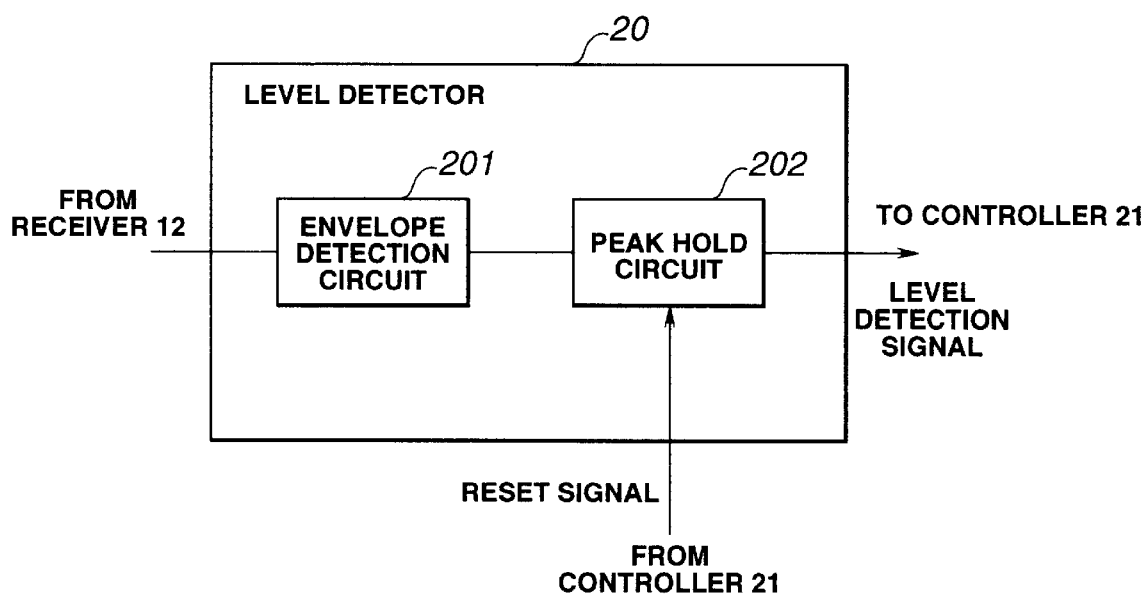
FIG. 2 is a block diagram showing an embodiment of configuring the level detector shown in FIG. 1.

FIG. 2 shows a detailed structure of the level detector 20 shown in FIG. 1.

The level detector 20 in FIG. 2 comprises an envelope detection circuit 201 and a peak hold circuit 202.

Specifically, a received signal outputted from the receiver 12 shown in FIG. 1 is passed through the envelope detection circuit 201 to detect its envelope, output of the envelope detection circuit 201 is added to the peak hold circuit 202, and the peak hold circuit 202 outputs a voltage signal, which corresponds to the envelope, of the received signal detected by the envelope detection circuit 201. This voltage signal is added as a level detection signal to the controller 21 shown in FIG. 1.

The controller 21 determines a free slot to be used according to the level detection signal outputted from the level detection circuit 20.

The peak hold circuit 202 is reset by a reset signal to be generated from the controller 21 for each slot to be measured for availability.

And, the signal received by the receiver device is a signal modulated by a π/4 shift QPSK linear modulation method.

Figure 3:
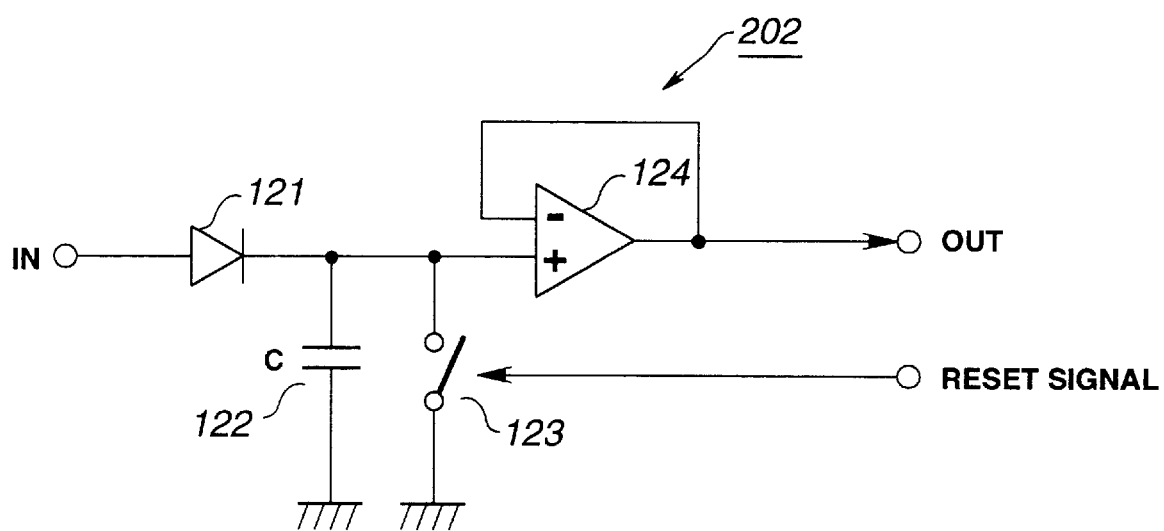
FIG. 3 is a circuit diagram showing an embodiment of the peak hold circuit shown in FIG. 2.

FIG. 3 shows a specific example of the peak hold circuit 202 shown in FIG. 2. The peak hold circuit 202 shown in FIG. 3 comprises a diode 121 which is connected to an input terminal IN, a capacitor 122 which is connected between the diode 121 and a ground, a switch 123 which is connected in parallel to the capacitor 122 and turned on or off by the reset signal, and a buffer amplifier 124 which receives an output of the capacitor 122 and outputs its output to an output terminal OUT.

When the switch 123 is turned off by the reset signal, a peak value of the signal entered into the input terminal IN is held in the capacitor 122, and a signal which corresponds to the peak value being held in the capacitor 122 is outputted to the output terminal OUT through the buffer amplifier 124.

And, when the switch 123 is turned on by the reset signal, the peak value being held in the capacitor 122 is cleared.

Figure 4:
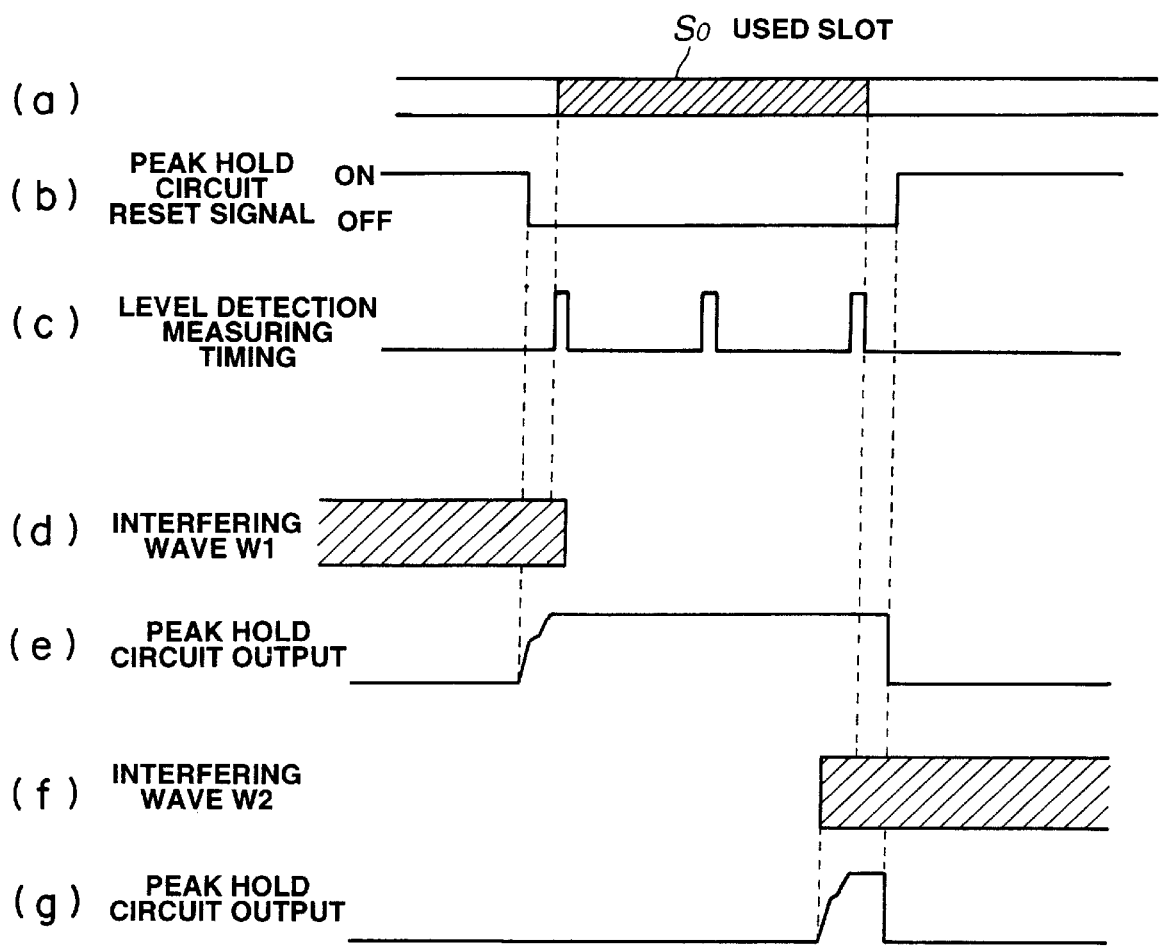
FIG. 4 is a timing chart illustrating the operation of the level detector shown in FIG. 2.

FIG. 4 is a timing chart illustrating the operation for detecting a free slot by the level detector 20 shown in FIG. 2.

FIG. 4 shows the operation when there are interfering waves W1 (part (d) of FIG. 4) and W2 (part (f) of FIG. 4) which are partly overlapped with a used slot SO to detect a free channel indicated by part (a) of FIG. 4.

The reset signal applied to the peak hold circuit 202 of the level detector 20 shown in FIG. 2 falls from ON to OFF immediately before the slot SO used for searching for a free channel and rises from OFF to ON immediately after the used slot SO as shown in part (b) of FIG. 4.

When the reset signal is in an ON state, the switch 123 shown in FIG. 3 is turned on, and the peak hold circuit 202 does not operate.

When the reset signal falls in an OFF state, the switch 123 shown in FIG. 3 is turned off, and the peak hold circuit 202 holds the peak value of the output of the envelope detection circuit 201 shown in FIG. 2 and outputs a signal corresponding to the peak value as a level detection signal.

And, the controller 21 detects whether the used slot SO is a free channel or not according to the level detection signal being outputted from the peak hold circuit 202.

As shown in part (c) of FIG. 4, the controller 21 refers to the level detection signal outputted from the peak hold circuit 202 to determine whether the used slot SO is available or not with the three points of head, middle and end of the used slot SO as level detection/measurement timing.

Specifically, when the level detection signal outputted from the peak hold circuit 202 is at a predetermined level or higher with the level detection/measurement timing at one of the head, middle and end of the used slot SO, the controller 21 determines that this slot SO is not a free channel.

In the above configuration, presence of the interfering wave W1 which partly overlaps at the head of the used slot SO as shown in part (d) of FIG. 4 will be described. As indicated in part (e) of FIG. 4, the level detection signal outputted from the peak hold circuit 202 rises when the reset signal indicated in part (b) of FIG. 4 falls from ON to OFF and falls when the reset signal indicated in part (b) of FIG. 4 rises from OFF to ON.

With the level detection/measurement timing at the head of the used slot SO, the level detection signal outputted from the peak hold circuit 202 has fully risen, and it is determined that the used slot SO with this level detection timing is not a free channel.

And, with the level detection timing at the middle and end of the used slot SO, the level detection signal being outputted from the peak hold circuit 202 is kept risen regardless of the absence of the interfering wave W1. But, it does not cause any problem because the used slot SO cannot be used in any event due to the interfering wave W1.

As indicated in part (f) of FIG. 4, presence of the interfering wave W2 which partly overlaps at the end of the used slot SO will be described. The level detection signal being outputted from the peak hold circuit 202 is risen by the interfering wave W2 as indicated in part (g) of FIG. 4 and falls when the reset signal rises from OFF to ON as indicated in part (b) of FIG. 4.

With the level detection/measurement timing at the end of the used slot SO, the level detection signal being outputted from the peak hold circuit 202 has fully risen, and it is determined that the used slot SO is not a free channel with this level detection/measurement timing.

In the configuration as described above, when there is the interfering wave W1 as indicated in part (d) of FIG. 4 or the interfering wave W2 as indicated in part (f) of FIG. 4, it is determined that the used slot SO is not a free channel. And, misjudgment that the used slot SO is determined to be a free channel regardless of the presence of the interfering wave can be prevented without fail, and a free channel can be detected with the same accuracy regardless of the position of the interfering wave.

When it is necessary to detect the level detection signal with precision with each level detection/measurement timing, it may be configured so that the peak hold circuit 202 is reset immediately before each level detection timing.

Where a level detection signal is produced by the peak hold circuit 202 as in the above embodiment, the level detection signal becomes different from the one which is based on the mean value of envelope of a received signal. A difference between the level detection signal based on the mean value of envelope and the level detection signal based on the peak value becomes large depending on a received signal modulation method. As a result, a detection error may become high depending on how the level detection signal is used.

Figure 5:
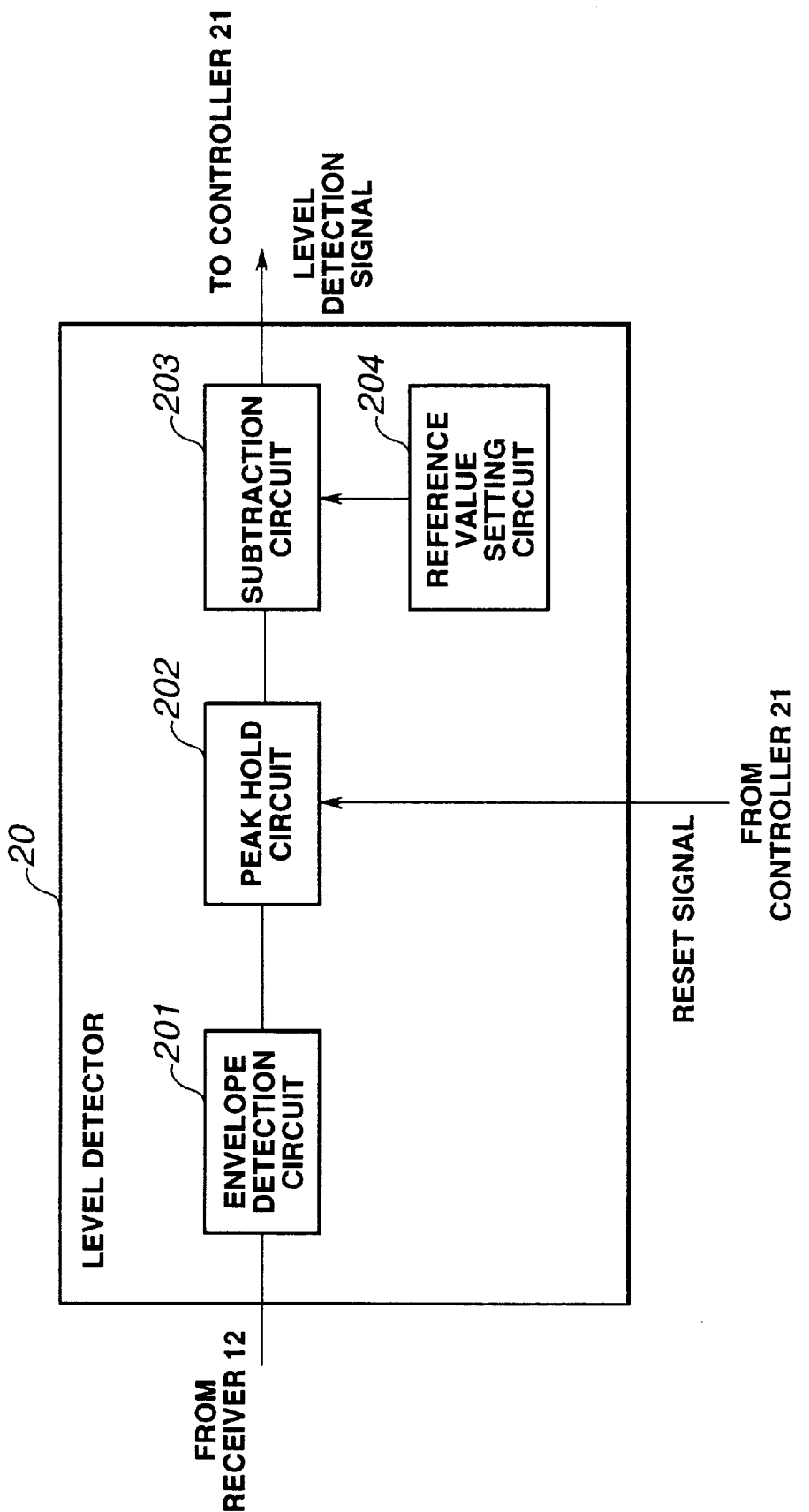
FIG. 5 is a block diagram showing another embodiment of the level detector shown in FIG. 1.

FIG. 5 shows another embodiment of the level detector 20 with the above-described disadvantage remedied. The embodiment shown in FIG. 5 includes a reference value setting circuit 204 which generates a reference voltage corresponding to a difference between the peak value and the mean value of the envelope determined by the modulation method and a subtraction circuit 203 which subtracts a voltage generated from the reference value setting circuit 204 from the output of the peak hold circuit 202; the output of the subtraction circuit 203 is outputted as a level detection signal. Its remaining configuration is the same as the one shown in FIG. 2. In this embodiment, a detection error owing to a modulation method can be reduced.

Figure 6:
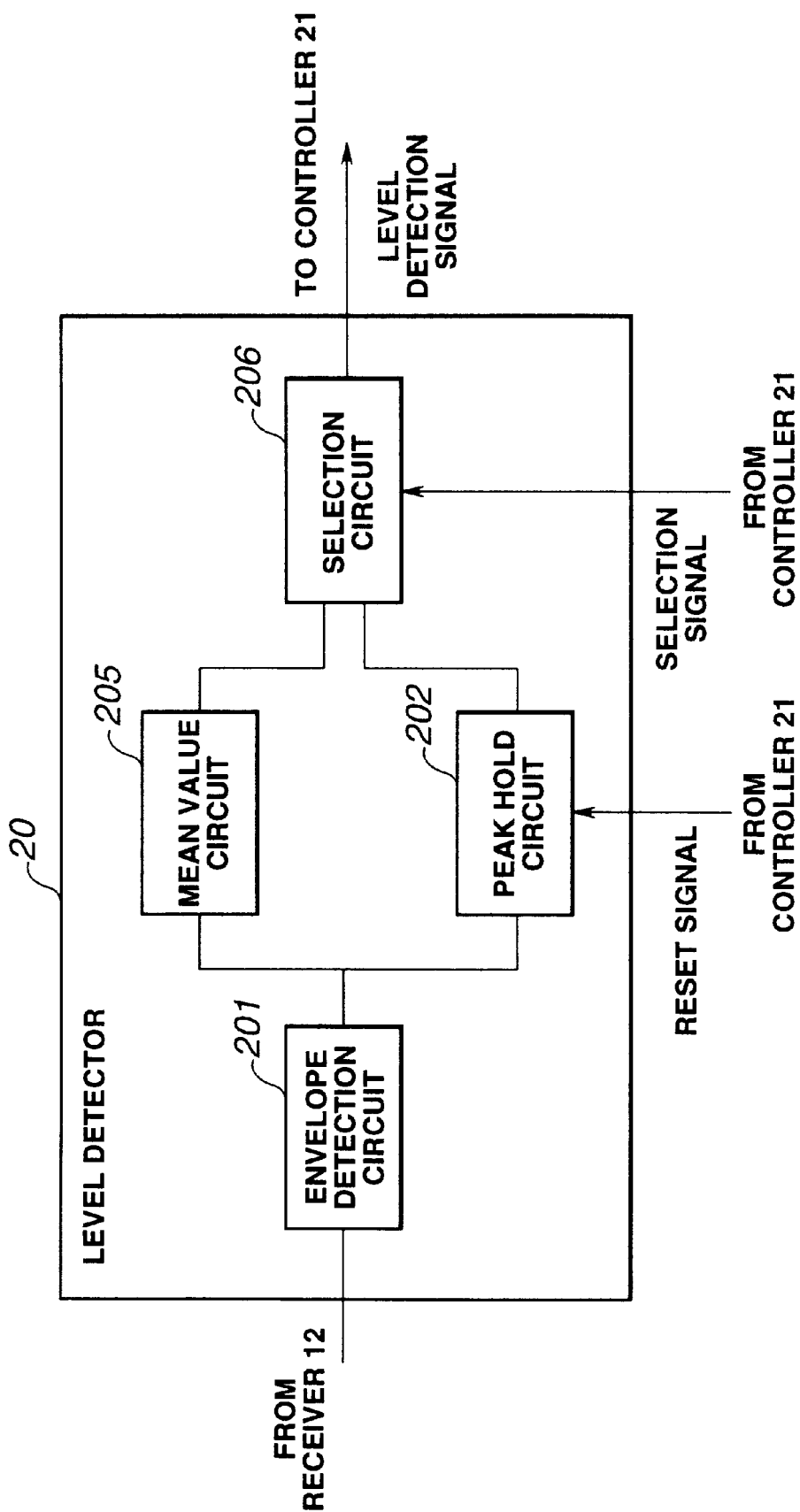
FIG. 6 is a block diagram showing still another embodiment of the level detector shown in FIG. 1.
Figure 7:
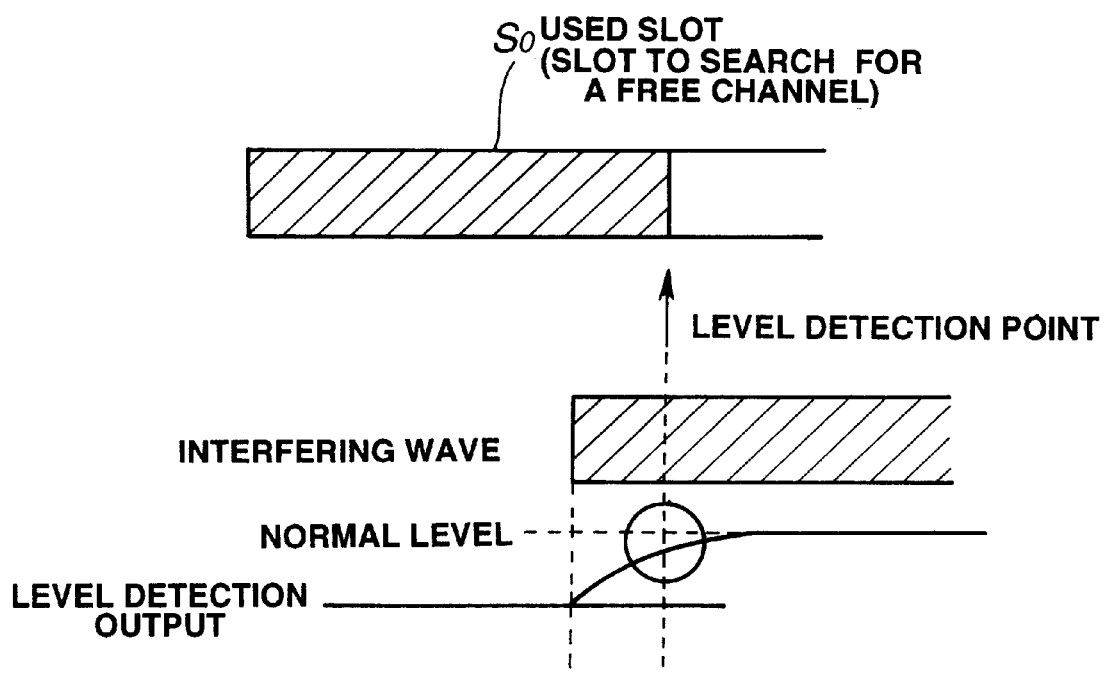
FIG. 7 is a timing chart illustrating a disadvantage of free channel detection by means of a mean value circuit.

FIG. 6 shows still another embodiment of the level detector circuit 20. In the embodiment shown in FIG. 6, the peak hold circuit 202 and a mean value circuit 205 are connected in parallel to the output of the envelope detection circuit 201, and the output of the peak hold circuit 202 and the output of the mean value circuit 205 are switched by a selection circuit 206 and outputted as a level detection signal.

And, the selection circuit 206 is controlled by the selection signal outputted from the controller 21 shown in FIG. 1, and the output of the peak hold circuit 202 or the output of the mean value circuit 205 is selectively outputted as the level detection signal.

In the configuration described above, when the output of the peak hold circuit 202 is selected to detect a free channel according to the selection signal and the output of the mean value circuit 205 is selected during an ordinary telephone call, accuracy of detecting a free channel can be improved, and an appropriate level detection signal can be obtained during an ordinary telephone call.

What is claimed is:

1. A method of detecting a free channel comprising:

a first step of receiving a time division multiplex signal which is modulated by linear modulation and multiplied into a plurality of time division channels;

a second step of detecting an envelope of the time division multiplex signal received in the first step;

a third step of operating from a timing immediately before a desired time division channel among the plurality of time division channels to a timing immediately after the desired time division channel, detecting a peak value of the envelope detected in the second step, holding the detected peak value and clearing the held peak value with the timing immediately after the desired time division channel; and a fourth step of determining whether the desired time division channel is free or not according to the peak value of the envelope held in the third step.

2. The method of detecting a free channel according to claim 1, wherein the fourth step determines a plurality of sampling values by sampling the peak value of the envelope held in the third step at a plurality of timing within the desired time division channel, and determines whether the desired time division channel is free or not according to the plurality of sampling values.

3. The method of detecting a free channel according to claim 1, wherein the fourth step deducts a desired reference value from the peak value of the envelope held in the third step and determines whether the desired time division channel is free or not according to the deducted value.

4. The method of detecting a free channel according to claim 1, wherein the fourth step includes:

a fifth step of determining a mean value of the envelope detected in the second step, and a sixth step of selecting either the peak value of the envelope held in the third step or the mean value detected in the fifth step; and wherein whether the desired time division channel is free or not is determined based on the peak value selected in the sixth step and a reception level is determined based on the mean value.

5. A device for detecting a free channel comprising:

receiving means for receiving a time division multiplex signal which is modulated by linear modulation and multiplied into a plurality of time division channels;

envelope detecting means for detecting an envelope of the time division multiplex signal received by the receiving means;

peak hold means for detecting a peak value of the envelope detected by the envelope detecting means by operating from a timing immediately before a desired time division channel among the plurality of time division channels to a timing immediately after the desired time division channel, holding the detected peak value and clearing the held peak value at the timing immediately after the desired time division channel; and judging means for determining whether the desired time division channel is free or not according to the peak value of the envelope held by the peak hold means.

6. The device for detecting a free channel according to claim 5, wherein the judging means includes:

sampling means for sampling the peak value of the envelope held by the peak hold means with a plurality of timing in the desired time division channel; and means for judging whether the desired time division channel is free or not according to a plurality of sampling values sampled by the sampling means.

7. The device for detecting a free channel according to claim 5, wherein the judging means includes:

deducting means for deducting a desired reference value from the peak value of the envelope held by the peak hold means; and means for judging whether the desired time division channel is free or not according to a deduction output of the deducting means.

8. The device for detecting a free channel according to claim 5, wherein the judging means includes:

mean value detecting means for determining a mean value of the envelope detected by the envelope detecting means;

selecting means for selecting either the peak value of the envelope held by the peak hold means or the mean value detected by the mean value detecting means;

means for determining whether the desired time division channel is free or not according to the peak value of the envelope held by the peak hold means selected by the selecting means; and means for determining a reception level according to the mean value selected by the selecting means.

9. A communication device comprising:

receiving means for receiving a time division multiplex signal which is modulated by linear modulation and multiplied into a plurality of time division channels;

envelope detecting means for detecting an envelope of the time division multiplex signal received by the receiving means;

peak hold means for detecting and holding a peak value of the envelope detected by the envelope detecting means by operating from a timing immediately before a desired time division channel among the plurality of time division channels to a timing immediately after the desired time division channel;

judging means for determining whether the desired time division channel is free or not according to the peak value of the envelope held by the peak hold means; and setting means for setting as a reception channel a time division channel determined as the free channel by the judging means.

10. The communication device according to claim 8, wherein the judging means comprises:

sampling means for sampling the peak value of the envelope held by the peak hold means at a plurality of timing in the desired time division channel; and means for judging whether the desired time division channel is free or not according to a plurality of sampling values sampled by the sampling means.

11. The communication device according to claim 9, wherein the judging means includes:

deducting means for deducting a desired reference value from the peak value of the envelope held by the peak hold means; and means for judging whether the desired time division channel is free or not according to a deduction output of the deducting means.

12. The communication device according to claim 9, wherein the judging means includes:

mean value detecting means for determining a mean value of the envelope detected by the envelope detecting means;

selecting means for selecting either the peak value of the envelope held by the peak hold means or the mean value detected by the mean value detecting means;

means for determining whether the desired time division channel is free or not according to the peak value of the envelope held by the peak hold means selected by the selecting means; and means for determining a reception level according to the mean value selected by the selecting means.

* * * * *